(12) United States Patent
Ichikawa et al.

(10) Patent No.: US 9,834,103 B2
(45) Date of Patent: Dec. 5, 2017

(54) NON-CONTACT ELECTRIC POWER TRANSMISSION SYSTEM

(71) Applicant: TOYOYA JIDOSHA KABUSHIKI KAISHA, Toyota-shi, Aichi-ken (JP)

(72) Inventors: Shinji Ichikawa, Toyota (JP); Satoshi Taniguchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 310 days.

(21) Appl. No.: 14/593,256

(22) Filed: Jan. 9, 2015

(65) Prior Publication Data

US 2015/0217650 A1 Aug. 6, 2015

(30) Foreign Application Priority Data

Jan. 31, 2014 (JP) .................................. 2014-017140

(51) Int. Cl.
*H02J 7/00* (2006.01)
*B60L 11/18* (2006.01)

(52) U.S. Cl.
CPC ......... *B60L 11/182* (2013.01); *B60L 11/1824* (2013.01); *B60L 11/1825* (2013.01); *B60L 11/1827* (2013.01); *B60L 11/1829* (2013.01); *B60L 11/1831* (2013.01); *B60L 11/1833* (2013.01); *B60L 11/1838* (2013.01); *B60L 11/1846* (2013.01); *B60L 2230/00* (2013.01); *B60L 2230/16* (2013.01); *B60L 2230/40* (2013.01); *B60L 2240/12* (2013.01); *B60L 2240/30* (2013.01); *B60L 2260/26* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
USPC ......................................................... 320/109
See application file for complete search history.

(56) References Cited

U.S. PATENT DOCUMENTS

| 7,193,394 B2 * | 3/2007 | Ueda ................... B60L 11/1809 320/128 |
| 7,741,734 B2 | 6/2010 | Joannopoulos et al. |
| 2007/0222542 A1 | 9/2007 | Joannopoulos et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Robert Grant
(74) *Attorney, Agent, or Firm* — Oliff PLC

(57) ABSTRACT

A vehicle emits a first signal when the vehicle moves after reception of electric power from an electric power transmission device by an electric power reception device is completed and when a preparatory condition for the vehicle to move is satisfied after reception of electric power from the electric power transmission device by the electric power reception device is completed. When a charging station receives the first signal, the charging station emits a second signal notifying that a state allows charging.

5 Claims, 5 Drawing Sheets

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0187317 A1 | 8/2011 | Mitake et al. |
| 2012/0323423 A1* | 12/2012 | Nakamura ............ B60L 11/123 701/22 |
| 2013/0127409 A1 | 5/2013 | Ichikawa |
| 2013/0193749 A1 | 8/2013 | Nakamura et al. |
| 2014/0019522 A1* | 1/2014 | Weng ................ G06F 17/30964 709/203 |
| 2014/0097671 A1 | 4/2014 | Nakamura et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102791517 A | 11/2012 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 | 1/2009 |
| JP | 2009-276927 A | 11/2009 |
| JP | A-2013-110822 | 6/2013 |
| JP | A-2013-126327 | 6/2013 |
| JP | A-2013-132170 | 7/2013 |
| JP | A-2013-135572 | 7/2013 |
| JP | A-2013-146148 | 7/2013 |
| JP | A-2013-146154 | 7/2013 |
| JP | A-2013-154815 | 8/2013 |
| JP | 2013-225969 A | 10/2013 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | 2012/176264 A1 | 12/2012 |
| WO | WO 2013/108108 A2 | 7/2013 |

* cited by examiner

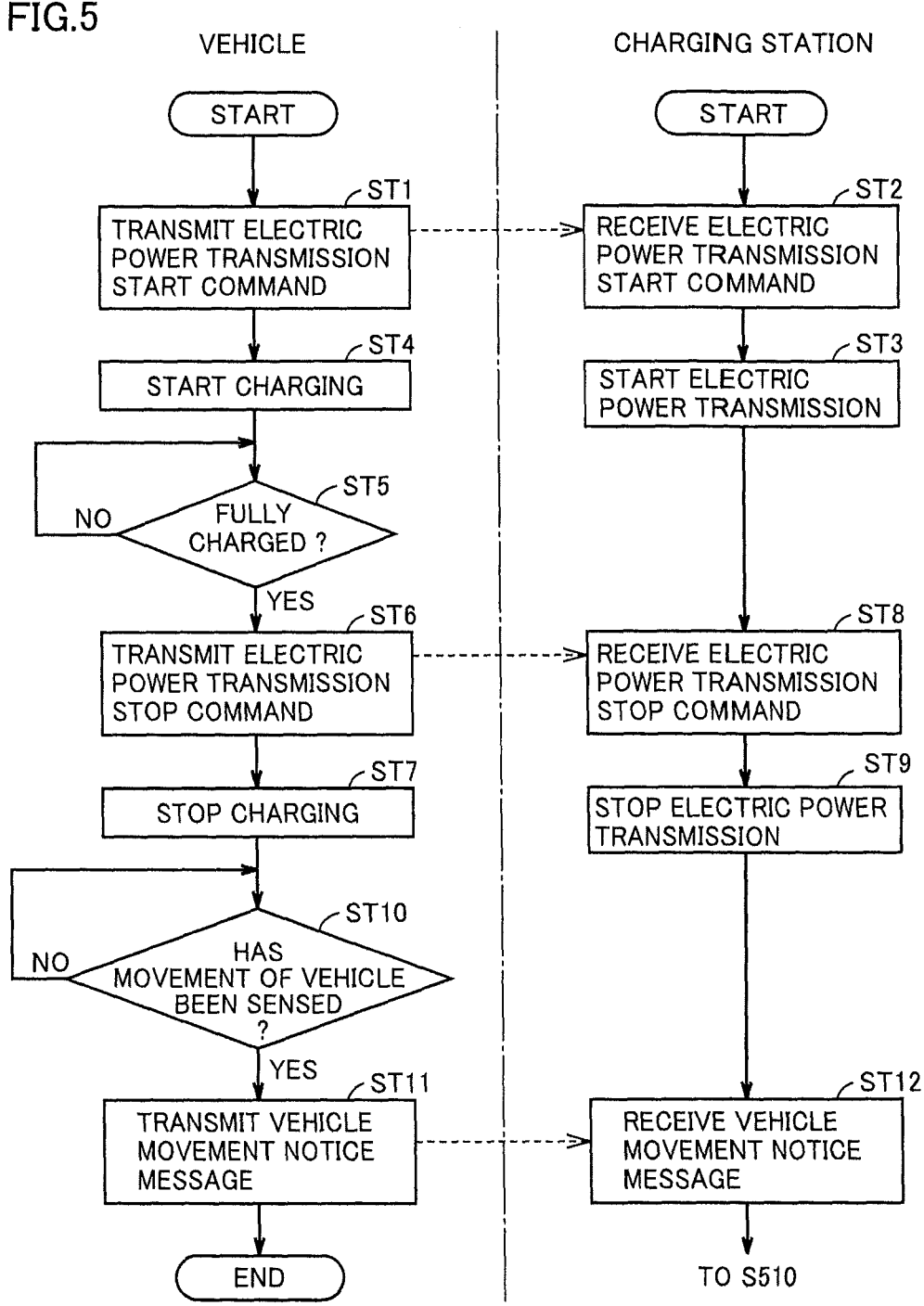

NON-CONTACT ELECTRIC POWER TRANSMISSION SYSTEM

This nonprovisional application is based on Japanese Patent Application No. 2014-017140 filed with the Japan Patent Office on Jan. 31, 2014, the entire contents of which are hereby incorporated by reference.

BACKGROUND OF THE INVENTION

Field of the Invention

The present invention relates to a non-contact electric power transmission system.

Description of the Background Art

Japanese Patent Laying-Open No. 2013-135572 discloses a system in which electric power is transmitted in a non-contact manner, between an electric power reception device mounted on a vehicle and an electric power transmission device provided in a charging station. In this system, positioning between a coil included in an electric power transmission device and a coil included in an electric power reception device and transmission of real electric power are carried out by transmitting various types of information between a charging station and a vehicle in transmission of electric power.

SUMMARY OF THE INVENTION

In the system described in Japanese Patent Laying-Open No. 2013-135572, however, when a vehicle which has completed charging moves away from an electric power transmission device, a charging station has not been able to sense movement of the vehicle away from the electric power transmission device. Consequently, another vehicle has been unable to be guided to a parking frame of the charging station. In order to sense movement of the vehicle away from the electric power transmission device, it may also be possible to provide a sensor for sensing whether or not a vehicle is present at an electric power transmission device or a parking frame, however, cost increases and installation work for attachment of the sensor requires efforts.

Therefore, an object of the present invention is to provide a non-contact electric power transmission system which can sense movement of a vehicle after charging and can guide another vehicle to a parking frame of a charging station with simplified means.

In order to solve the problem above, the present invention is directed to a non-contact electric power transmission system in which electric power is transmitted between a vehicle and a charging station in a non-contact manner, the charging station including an electric power transmission device transmitting electric power in a non-contact manner. The vehicle includes an electric power reception device receiving electric power in a non-contact manner. The vehicle emits a first signal when the vehicle moves after reception of electric power from the electric power transmission device by the electric power reception device is completed and when a preparatory condition for the vehicle to move is satisfied after reception of electric power from the electric power transmission device by the electric power reception device is completed. The charging station emits a second signal notifying that a state allows charging when the charging station receives the first signal.

According to the present invention, with simplified means, movement of a vehicle away from an electric power transmission device after charging can be sensed and another vehicle can be guided to a charging station.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart representing details of processing for full-scale electric power reception in step S90 in FIG. 4 and processing for full-scale electric power transmission in S590.

DESCRIPTION OF THE PREFERRED EMBODIMENTS

An embodiment of the present invention will be described hereinafter with reference to the drawings.

(Configuration of Non-Contact Electric Power Transmission System)

Figure 1:
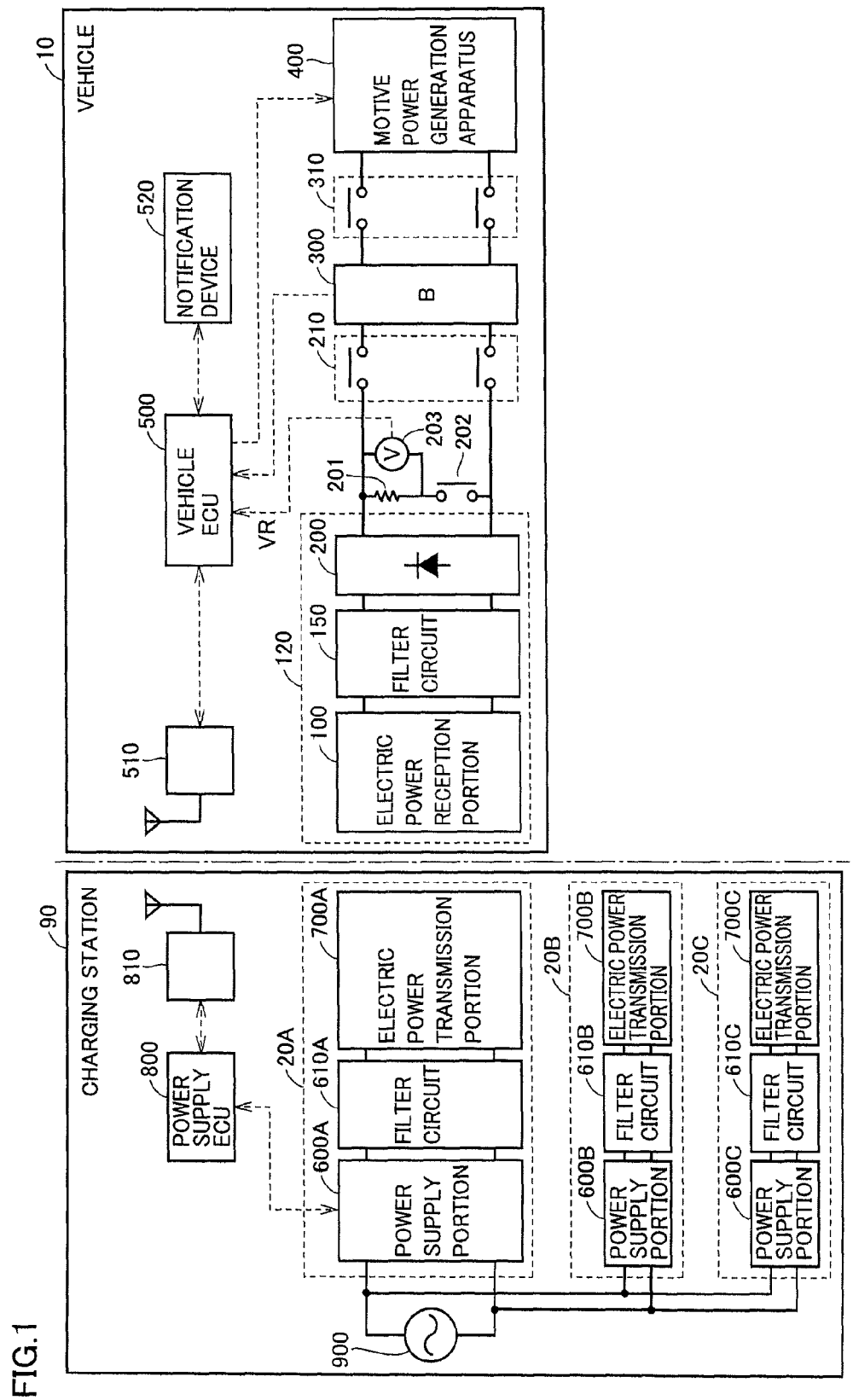
FIG. 1 is an overall configuration diagram of a non-contact electric power transmission system representing one example of an embodiment of the present invention.

FIG. 1 is an overall configuration diagram of a non-contact electric power transmission system representing one example of an embodiment of the present invention.

Referring to FIG. 1, a non-contact electric power transmission system in the present embodiment is constituted of a vehicle 10 on which an electric power reception device 120 configured to be able to receive electric power in a non-contact manner is mounted and a charging station 90 including electric power transmission devices 20A, 20B, and 20C transmitting electric power from the outside of the vehicle to an electric power reception portion 100.

Details of a specific configuration of vehicle 10 and charging station 90 will further be described below.

Vehicle 10 includes electric power reception device 120, a power storage device 300, a motive power generation apparatus 400, a communication device 510, a vehicle ECU 500, and a notification device 520. Electric power reception device 120 includes electric power reception portion 100, a filter circuit 150, and a rectification portion 200.

Charging station 90 includes an external power supply 900, electric power transmission devices 20A, 20B, and 20C, a communication device 810, and a power supply ECU 800. Electric power transmission devices 20A, 20B, and 20C include power supply portions 600A, 600B, and 600C, filter circuits 610A, 610B, and 610C, and electric power transmission portions 700A, 700B, and 700C, respectively.

Figure 2:
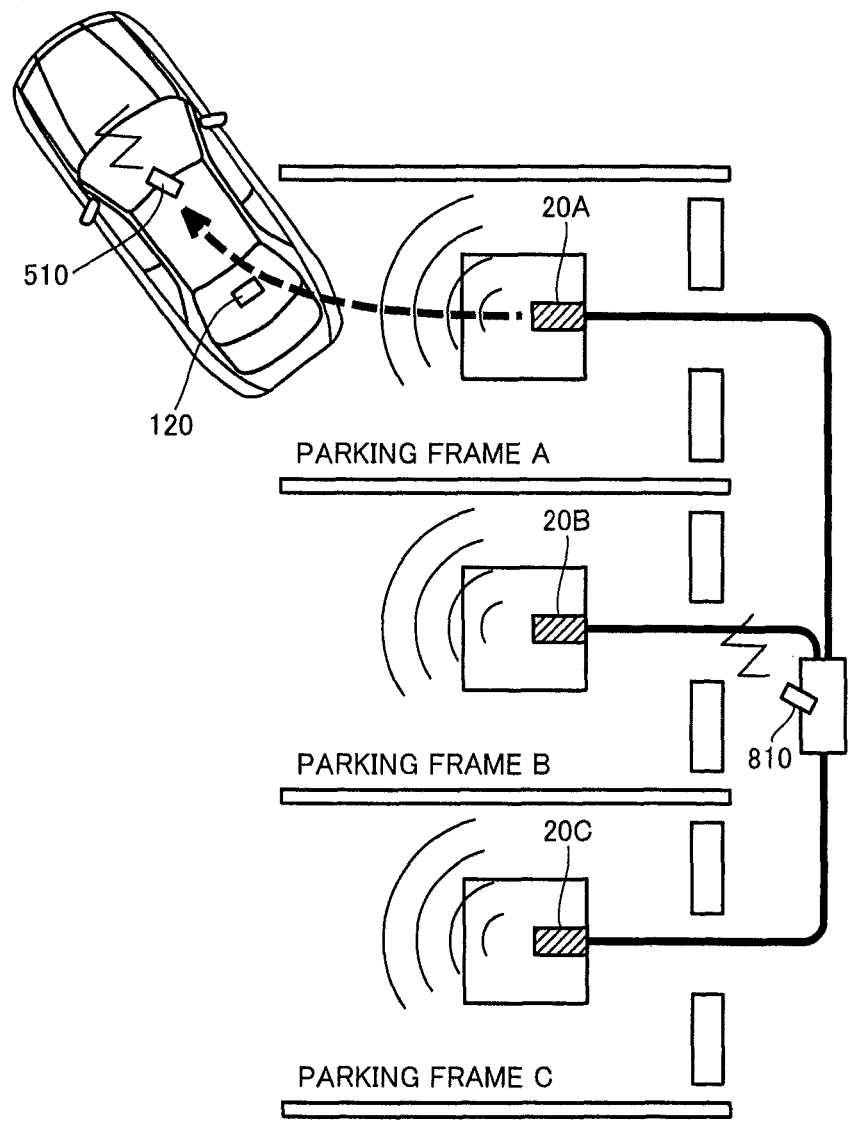
FIG. 2 is a diagram for illustrating parking of a vehicle at a parking frame within a charging station.

For example, as shown in FIG. 2, electric power transmission devices 20A, 20B, and 20C are provided on or in the ground at parking frames A, B, and C, respectively, and electric power reception device 120 is arranged in a lower portion of a vehicle body. A location of arrangement of electric power reception device 120 is not limited as such. For example, when electric power transmission devices 20A, 20B, and 20C are provided above vehicle 10, electric power reception device 120 may be provided in an upper portion of the vehicle body.

Electric power reception portion 100 includes a secondary coil for receiving in a non-contact manner, (AC) electric power output from any of electric power transmission portions 700A, 700B, and 700C of electric power transmission devices 20A, 20B, and 20C. Electric power reception portion 100 outputs received electric power to rectification portion 200. Rectification portion 200 rectifies AC power received by electric power reception portion 100 and outputs the AC power to power storage device 300. Filter circuit 150 is provided between electric power reception portion 100 and rectification portion 200 and suppresses harmonic noise generated during electric power reception from any of electric power transmission portions 700A, 700B, and 700C. Filter circuit 150 is formed, for example, from an LC filter including an inductor and a capacitor.

Power storage device 300 is a rechargeable DC power supply and it is implemented, for example, by such a secondary battery as a lithium ion battery or a nickel metal hydride battery. A voltage of power storage device 300 is, for example, around 200 V. Power storage device 300 stores not only electric power output form rectification portion 200 but also electric power generated by motive power generation apparatus 400. Then, power storage device 300 supplies the stored electric power to motive power generation apparatus 400. A large-capacity capacitor can also be adopted as power storage device 300. Though not particularly illustrated, a DC-DC converter regulating an output voltage from rectification portion 200 may be provided between rectification portion 200 and power storage device 300.

Motive power generation apparatus 400 generates driving force for running of vehicle 10 by using electric power stored in power storage device 300. Though not particularly illustrated, motive power generation apparatus 400 includes, for example, an inverter receiving electric power from power storage device 300, a motor driven by the inverter, and drive wheels driven by the motor. Motive power generation apparatus 400 may include a generator for charging power storage device 300 and an engine which can drive the generator.

Vehicle ECU 500 includes a central processing unit (CPU), a storage device, and an input/output buffer (none of which is shown), receives input of signals from various sensors and outputs control signals to each device, and controls each device in vehicle 10. By way of example, vehicle ECU 500 controls running of vehicle 10 and charging of power storage device 300. Such control is not limited to processing by software and processing with dedicated hardware (electronic circuitry) can also be performed.

A relay 210 is provided between rectification portion 200 and power storage device 300. Relay 210 is turned on by vehicle ECU 500 during charging of power storage device 300 by electric power transmission devices 20A, 20B, and 20C, A system main relay (SMR) 310 is provided between power storage device 300 and motive power generation apparatus 400. SMR 310 is turned on by vehicle ECU 500 when start-up of motive power generation apparatus 400 is requested.

A relay 202 is provided between rectification portion 200 and relay 210. A voltage VR across opposing ends of a resistor 201 connected in series with relay 202 is detected by a voltage sensor 203, and sent to vehicle ECU 500.

Vehicle ECU 500 communicates with communication device 810 of charging station 90 through communication device 510 during charging of power storage device 300 by electric power transmission devices 20A, 20B, and 20C and exchanges with power supply ECU 800, information on start/stop of charging or an electric power reception condition of vehicle 10.

FIG. 2 is a diagram for illustrating positioning between electric power reception device 120 and electric power transmission device 20A with movement of vehicle 10. Referring to FIG. 2, vehicle 10 or charging station 90 determines whether or not the secondary coil within electric power reception device 120 is positioned with respect to a primary coil within electric power transmission device 20A based on a not-shown car-mounted camera or on intensity of received electric power during test electric power transmission (transmission of weak electric power) by electric power transmission portion 700A, and a user is notified of a result through notification device 520. The user moves vehicle 10 such that positional relation between electric power reception device 120 and electric power transmission device 20A is good for electric power transmission and reception based on information obtained from notification device 520. The user does not necessarily have to operate a steering wheel or an accelerator, and vehicle 10 may automatically move for positioning while the user monitors such an operation on notification device 520.

Referring again to FIG. 1, power supply portions 600A, 600B, and 600C receive electric power from external power supply 900 such as a commercial system power supply and generate AC power having a prescribed transmission frequency.

Electric power transmission portions 700A, 700B, and 700C each include a primary coil for non-contact electric power transmission to electric power reception portion 100. Electric power transmission portions 700A, 700B, and 700C each receive AC power having a transmission frequency from power supply portions 600A, 600B, and 600C and transmit electric power to electric power reception portion 100 of vehicle 10 in a non-contact manner through electromagnetic field generated around electric power transmission portions 700A, 700B, and 700C.

Filter circuits 610A, 610B, and 610C are provided between power supply portions 600A, 600B, and 600C and electric power transmission portions 700A, 700B, and 700C, respectively, and suppress harmonic noise generated from power supply portions 600A, 600B, and 600C. Filter circuits 610A, 610B, and 610C are each formed from an LC filter including an inductor and a capacitor.

Power supply ECU 800 includes a CPU, a storage device, and an input/output buffer (none of which is shown), receives input of signals from various sensors and outputs control signals to each device, and controls each device in charging station 90. By way of example, power supply ECU 800 controls switching of power supply portions 600A, 600B, and 600C such that power supply portions 600A, 600B, and 600C generate AC power having a transmission frequency. Such control is not limited to processing by software and processing with dedicated hardware (electronic circuitry) can also be performed.

Power supply ECU 800 communicates with communication device 510 of vehicle 10 through communication device 810 during electric power transmission to vehicle 10, and exchanges with vehicle 10, information on start/stop of charging or an electric power reception condition of vehicle 10.

AC power having a prescribed transmission frequency is supplied from power supply portions 600A, 600B, and 600C to electric power transmission portions 700A, 700B, and 700C through filter circuits 610A, 610B, and 610C. Each of electric power transmission portions 700A, 700B, and 700C and electric power reception portion 100 of vehicle 10 includes a coil and a capacitor, and is designed to resonate at the transmission frequency. A Q value representing resonance intensity of electric power transmission portions 700A, 700B, and 700C and electric power reception portion 100 is preferably 100 or higher.

When AC power is supplied from power supply portions 600A, 600B, and 600C to electric power transmission portions 700A, 700B, and 700C through filter circuits 610A, 610B, and 610C, energy (electric power) is transferred from any of electric power transmission portions 700A, 700B, and 700C to electric power reception portion 100 through electromagnetic field formed between the primary coil included in any of electric power transmission portions 700A, 700B, and 700C and the secondary coil of electric power reception portion 100. Then, energy (electric power) transferred to electric power reception portion 100 is supplied to power storage device 300 through filter circuit 150 and rectification portion 200.

Though not particularly illustrated, in electric power transmission devices 20A, 20B, and 20C, an insulating transformer may be provided between electric power transmission portions 700A, 700B, and 700C and power supply portions 600A, 600B, and 600C (for example, between electric power transmission portions 700A, 700B, and 700C and filter circuits 610A, 610B, and 610C). In vehicle 10 as well, an insulating transformer may be provided between electric power reception portion 100 and rectification portion 200 (for example, between electric power reception portion 100 and filter circuit 150).

(Procedure of Non-Contact Electric Power Transmission)

Figure 3:
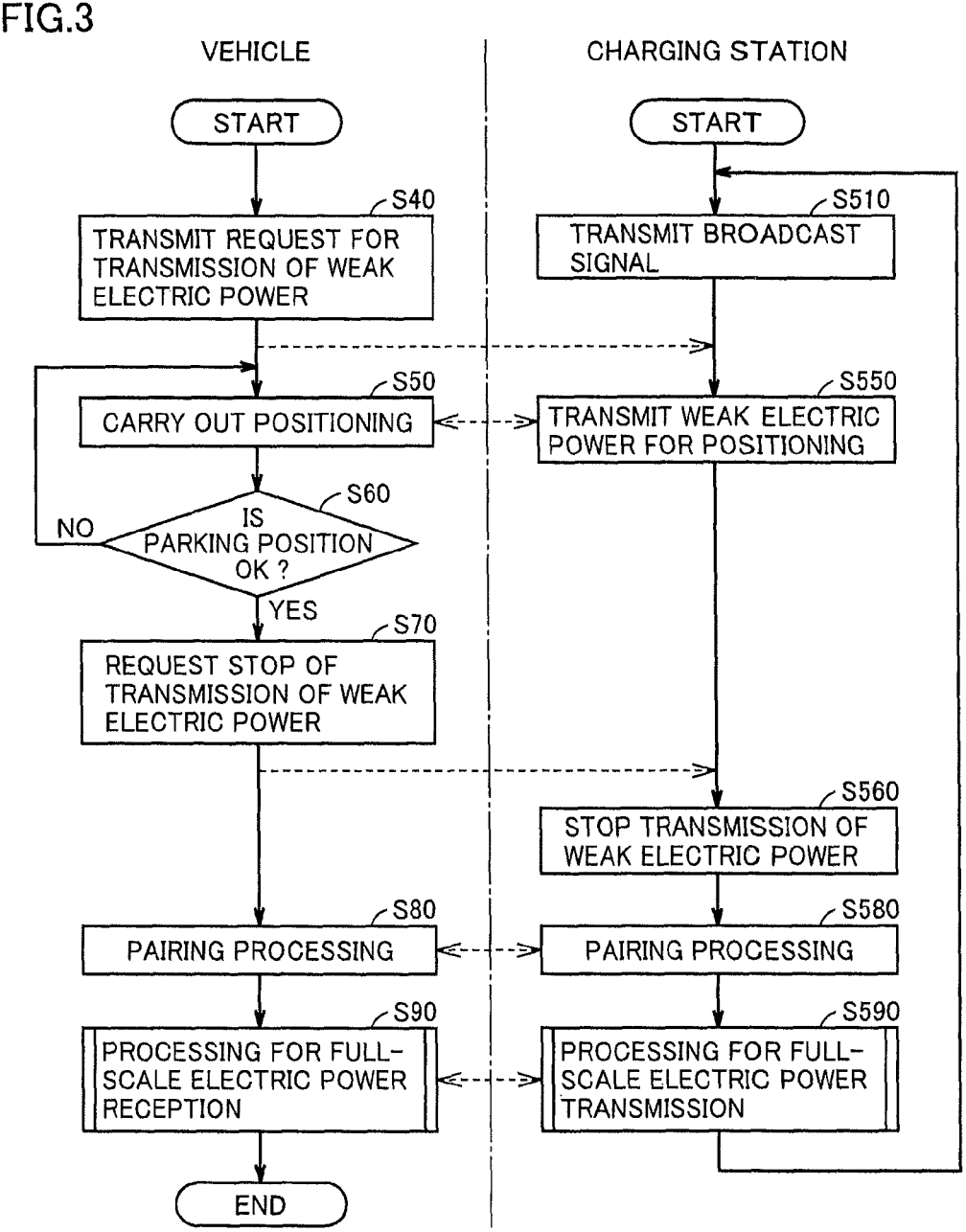
FIG. 3 is a flowchart for illustrating overview of processing performed by a vehicle and a charging station in non-contact electric power transmission.
Figure 4:
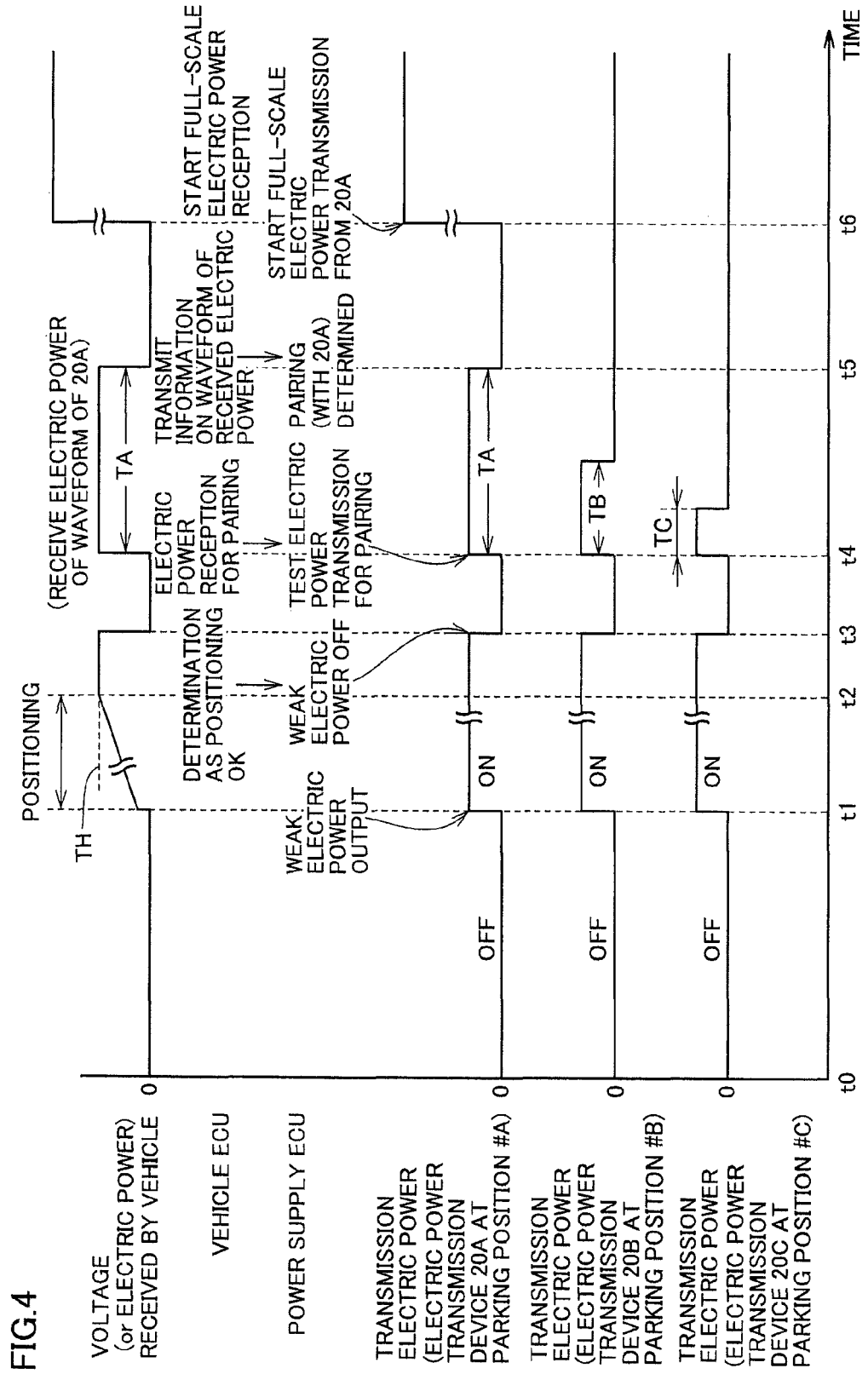
FIG. 4 is a timing chart representing variation in transmission electric power and a received voltage which are varied during the course of the processing in FIG. 3.

FIG. 3 is a flowchart for illustrating overview of processing performed by vehicle 10 and charging station 90 in non-contact electric power transmission. FIG. 4 is a timing chart representing variation in transmission electric power and a received voltage which are varied during the course of the processing in FIG. 3.

Referring to FIGS. 1, 3, and 4, when there is an empty parking frame, in step S510, power supply ECU 800 of charging station 90 broadcasts a message (emits a second signal) notifying that a situation allows charging through communication device 810, in order to guide vehicle 10 to the parking frame of charging station 90.

Timing for charging station 90 to broadcast (emit the second signal) is, for example, at the time when it determines that no vehicle is stopped above at least one of electric power transmission devices 20A, 20B, and 20C of the plurality of electric power transmission devices 20A, 20B, and 20C and when a broadcast signal (the first signal) from a vehicle which will be described later is received.

When vehicle ECU 500 receives the message notifying that the situation allows charging through communication device 510 in step S40, vehicle ECU 500 transmits a request for transmission of weak electric power for positioning through communication device 510.

In charging station 90, electric power transmission devices 20A, 20B, and 20C transmit in step S550, weak electric power for positioning with electric power reception device 120.

In step S50, vehicle 10 carries out positioning through automatic or manual movement of vehicle 10 (see a time point t1 in FIG. 4). During positioning, vehicle ECU 500 renders relay 202 conductive and obtains magnitude of a received voltage VR which is produced across the opposing ends of resistor 201 and detected by voltage sensor 203. Since this voltage is lower than a voltage in full-scale electric power transmission, vehicle ECU 500 sets relay 210 to off so as not to be affected by power storage device 300 during detection.

When magnitude of received voltage VR has exceeded a threshold value TH, vehicle ECU 500 notifies the user in step S60 of the fact that positioning has been successful through notification device 520. Thereafter, when the user gives a notification that the parking position is OK by pressing a parking switch within vehicle 10, the process proceeds to step S70 (see a time point t2 in FIG. 4).

In step S70, vehicle ECU 500 transmits a request for stopping transmission of weak electric power for positioning. In step S560, power supply ECU 800 of charging station 90 receives the request for stopping transmission of weak electric power, and transmission of weak electric power for positioning by electric power transmission devices 20A, 20B, and 20C ends (see a time point t3 in FIG. 4).

In contrast to a constant voltage on a primary side (an output voltage from electric power transmission devices 20A, 20B, and 20C), a voltage on a secondary side (received voltage VR) varies in accordance with a distance between the primary coils of electric power transmission devices 20A, 20B, and 20C and the secondary coil of electric power reception device 120. Then, relation of a difference in position in a horizontal direction between center of gravity O1 of the core of the primary coil and center of gravity O2 of the core of the secondary coil with received voltage VR is determined in advance, and received voltage VR corresponding to an allowable value for the difference in position in the horizontal direction between center of gravity O1 of the core of the primary coil and center of gravity O2 of the core of the secondary coil is set as threshold value TH.

In step S80 and step S580, vehicle ECU 500 and power supply ECU 800 perform pairing processing for determining with which of electric power transmission devices 20A, 20B, and 20C positioning has been achieved.

Power supply ECU 800 differentiates a duration of on of transmission electric power for each electric power transmission device. Namely, electric power transmission device 20A turns on transmission electric power for a time period of TA, electric power transmission device 20B turns on transmission electric power for a time period of TB, and electric power transmission device 20C turns on transmission electric power for a time period of TC (see a time point t4 in FIG. 4).

Vehicle ECU 500 notifies power supply ECU 800 of the duration of on of received electric power, through communication device 510. In the example in FIG. 4, electric power reception device 120 receives transmission electric power from electric power transmission device 20A. Vehicle ECU 500 notifies power supply ECU 800 of the fact that the duration of on of received electric power is TA. Thus, power supply ECU 800 can know that positioning with respect to electric power transmission device 20A has been carried out.

In step S590, charging station 90 performs processing for full-scale electric power transmission from the electric power transmission device which has completed positioning (see a time point t6 in FIG. 4). In the example in FIG. 4, electric power transmission device 20A performs processing for electric power transmission. In step S90, vehicle 10 performs processing for full-scale electric power reception by electric power reception device 120 and power storage device 300 is charged with received electric power.

FIG. 5 is a flowchart representing details of processing for full-scale electric power reception in step S90 in FIG. 4 and processing for full-scale electric power transmission in S590.

Referring to FIG. 5, in step ST1, vehicle ECU 500 transmits an electric power transmission start command through communication device 510. In step ST2, power supply ECU 800 receives the electric power transmission start command through communication device 810.

In step ST3, power supply ECU 800 has electric power transmission started. In step ST4, vehicle ECU 500 has charging started.

In step ST5, when power storage device 300 is fully charged or charged to a prescribed amount, the process proceeds to step ST6.

In step ST6 and step ST7, vehicle ECU 500 transmits an electric power transmission stop command through communication device 510 and vehicle ECU 500 has charging stopped. In steps ST8 and ST9, power supply ECU 800 receives the electric power transmission stop command through communication device 810 and power supply ECU 800 has electric power transmission stopped.

In step ST10, when movement of vehicle 10 is sensed, the process proceeds to step ST11. Here, for example, when a vehicle speed exceeds a prescribed speed, when a value obtained by summing vehicle speeds exceeds a prescribed value, when a current position of vehicle 10 obtained from a global positioning system (GPS) is distant from a position of parking frame A, B, or C by a prescribed distance or more (when vehicle 10 moves from electric power transmission device 20A, 20B, or 20C), or when a shift position is changed from a parking position to a drive position (when a preparatory condition for vehicle 10 to move is satisfied), vehicle ECU 500 detects movement of vehicle 10.

In step ST11, vehicle ECU 500 transmits a vehicle movement notice message (emits the first signal) through communication device 510. In step ST12, power supply ECU 800 receives the vehicle movement notice message through communication device 810. Thereafter, the process returns to step S510, and when there is an empty parking frame as a result of movement of vehicle 10 after a parking full state, power supply ECU 800 broadcasts a message (emits the second signal) notifying that a situation allows charging, in order to guide another vehicle to the parking frame of charging station 90.

Thus, in the non-contact electric power transmission system according to the present embodiment, vehicle 10 broadcasts (emits the second signal) in at least one case of when vehicle 10 moves from electric power transmission device 20A, 20B, or 20C after reception of electric power from any of electric power transmission devices 20A, 20B, and 20C is completed and when a preparatory condition for movement from electric power transmission device 20A, 20B, or 20C is satisfied after reception of electric power from electric power transmission device 20A, 20B, or 20C is completed as described above. Thus, the second signal is a signal for notifying that vehicle 10 can be charged, and when the charging station determines that vehicles 10 are stopped over all electric power transmission devices, it does not broadcast to the surroundings. Thus, when a parking lot is full, guide of vehicle 10 to the charging station is prevented, and when there is free electric power transmission device 20A, 20B, or 20C, new vehicle 10 is guided to the charging station.

As above, according to the present embodiment, the vehicle transmits a vehicle movement notice message to the charging station when the vehicle moves after end of charging, so that the charging station can sense movement of the vehicle away from the electric power transmission device and guide another vehicle to the charging station.

The pairing processing in step S80 and step S580 in FIG. 3 is not limited to the processing described above. For example, power supply ECU 800 differs a cycle of switching between on and off of transmission electric power for each electric power transmission device. Namely, electric power transmission device 20A switches between on and off of transmission electric power every cycle ΔTA, electric power transmission device 20B switches between on and off of transmission electric power every cycle ΔTB, and electric power transmission device 20C switches between on and off of transmission electric power every cycle ΔTC. Vehicle ECU 500 notifies power supply ECU 800 of a cycle of switching between on and off of received electric power. For example, when electric power reception device 120 receives transmission electric power from electric power transmission device 20A, vehicle ECU 500 notifies power supply ECU 800 of the fact that the cycle of switching between on and off of received electric power is set to ΔTA. Power supply ECU 800 thus knows that positioning with electric power transmission device 20A has been completed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-contact electric power transmission system in which electric power is transmitted between a vehicle and a charging station in a non-contact manner, comprising:
the charging station, including an electric power transmission device that transmits electric power in a non-contact manner; and
the vehicle, including an electric power reception device that receives electric power in a non-contact manner and a power storage device, the vehicle emitting a first signal when the vehicle moves and a preparatory condition for the vehicle to move is satisfied, after charging of the power storage device using electric power from the electric power transmission device is completed,
wherein the charging station emits a second signal notifying that a state allows charging when the charging station receives the first signal.

2. The non-contact electric power transmission system according to claim 1, wherein
the vehicle emits the first signal when a speed of the vehicle exceeds a prescribed speed.

3. The non-contact electric power transmission system according to claim 1, wherein
the vehicle emits the first signal when a value obtained by summing speeds of the vehicle exceeds a prescribed value.

4. The non-contact electric power transmission system according to claim 1, wherein
the vehicle emits the first signal when a current position of the vehicle obtained from a GPS system is distant from a position of a parking frame of the charging station by a prescribed distance or more.

5. The non-contact electric power transmission system according to claim 1, wherein
the vehicle emits the first signal when a shift position of the vehicle is changed from a parking position to a drive position.

* * * * *